United States Patent

Nakayama et al.

[11] Patent Number: 5,827,613
[45] Date of Patent: Oct. 27, 1998

[54] ARTICLES HAVING DIAMOND-LIKE PROTECTIVE FILM AND METHOD OF MANUFACTURING THE SAME

[75] Inventors: Masatoshi Nakayama; Masanori Shibahara, both of Saku, Japan

[73] Assignee: TDK Corporation, Tokyo, Japan

[21] Appl. No.: 209,571

[22] Filed: Mar. 10, 1994

Related U.S. Application Data

[63] Continuation-in-part of Ser. No. 940,593, Sep. 4, 1992, abandoned.

[51] Int. Cl.[6] .................................................. B29C 33/56
[52] U.S. Cl. ..................... 428/408; 249/114.1; 249/134; 249/135; 428/432; 428/457; 428/469; 428/655; 428/660; 428/661; 428/663; 428/664; 428/678
[58] Field of Search .................................. 249/11.1, 134, 249/135; 428/408, 432, 457, 469, 655, 660, 1, 3, 4, 678

[56] References Cited

U.S. PATENT DOCUMENTS

| | | | |
|---|---|---|---|
| 4,504,519 | 3/1985 | Zelez | 428/408 |
| 4,603,082 | 7/1986 | Zelez | 428/408 |
| 4,647,494 | 3/1987 | Meyerson et al. | 428/408 |
| 4,996,079 | 2/1991 | Itoh | 427/39 |
| 5,008,002 | 4/1991 | Uno et al. | 427/133 |
| 5,045,165 | 9/1991 | Yamashita | 204/192.16 |
| 5,159,508 | 10/1992 | Grill et al. | 310/103 |
| 5,175,658 | 12/1992 | Chang et al. | 360/103 |
| 5,190,823 | 3/1993 | Anthony et al. | 428/457 |
| 5,198,285 | 3/1993 | Arai et al. | 428/408 |

FOREIGN PATENT DOCUMENTS

| | | |
|---|---|---|
| 0142176 | 5/1985 | European Pat. Off. . |
| 62-196371 | 8/1987 | Japan . |
| 61397 | 3/1989 | Japan . |

OTHER PUBLICATIONS

TRC News, Jan. 1987, vol. 6–1, p. 7 published by Torey Research Center and translation.
Journal of Applied Physics of Japan, vol. 55, No. 7 (1986), p. 640 and translation.

Primary Examiner—A. A. Turner
Attorney, Agent, or Firm—Sprung Horn Kramer & Woods

[57] ABSTRACT

Articles having a diamond-like protective film formed thereon, each comprising a substrate of a material selected from the group consisting of alloys containing at least Co, Ni, or Fe, ceramics, and glass and which has only a slight affinity for a diamond-like thin film, an Mo film formed on the substrate, and a diamond-like thin film formed further thereon. Such articles are manufactured by a method which comprises holding a grid made of Mo close to the surface of the substrate, bombarding the grid and the substrate surface with a bombarding gas consisting of inert gas atoms of Ar or the like, thereby removing contaminants from the surface and depositing Mo atoms on the substrate surface to form an Mo film thereon, ionizing a low-molecular-weight hydrocarbon or a feed gas capable of producing a low-molecular-weight hydrocarbon upon decomposition or reaction, and then accelerating the resulting ions and depositing the same on the Mo film to form a diamond-like film thereon. The substrate is preferably a metallic mold constructed of a hardened steel. The Mo film enhances the bond of the diamond-like film to the substrate and improves the strength of the mold surface.

4 Claims, 3 Drawing Sheets

ARTICLES HAVING DIAMOND-LIKE PROTECTIVE FILM AND METHOD OF MANUFACTURING THE SAME

This application is a continuation-in-part application of application Ser. No. 07/940,593, filed Sep. 4, 1992 and now abandoned.

BACKGROUND OF THE INVENTION

This invention relates to articles protected with diamond-like thin film, such as metallic molds, and a method of manufacturing the articles. More particularly, it relates to a film-forming technology whereby the adhesion or bond properties of a diamond-like thin film are improved with respect to certain substrates, such as metallic molds, to which the films usually are slightly adhesive or binding.

"Diamond-like film" or "diamond-like thin film" used herein in connection with the present invention is defined as an amorphous carbon film having a Raman's absorption at about 1,550 cm$^{-1}$. It should be noted that the diamond-like film is clearly different from diamond film because the latter has a sharp Raman's absorption peak at 1,333 cm$^{-1}$ and is an aggregate of micro crystals. Diamond-like film does not have Raman's absorption peak at 1,333 cm$^{-1}$ and usually such diamond-like film or diamond-like thin film has a Vickers hardness Hv of at least 5,000 kg/mm$^2$ (refer, e.g., to TRC News, January 1987, Vol. 6-1, page 7, published by Torey Research Center and Journal of Applied Physics of Japan, Vol. 55, No. 7 (1986), page 640).

The diamond-like thin film produced by a vapor phase process has great hardness and outstanding wear resistance, durability, and resistance to chemical and corrosive attacks. Also it can form coatings on articles of whatever shapes desired. It is therefore useful or promising as protective coatings for articles that require one or more such beneficial properties, e.g., injection, extrusion, and compression molds and dies for glass and plastics.

Methods of manufacturing diamond-like thin films by the vapor phase process are varied (refer, e.g., to HYOMEN KAGAKU (Surface Chemistry), vol. 5, No. 108 (1984), pp. 108–115 "Various methods"). Diamond-like thin films are extensively used as corrosion-resistant and wear-resistant protective films coating the surfaces of variously shaped articles that need to be protected.

The diamond-like thin films thus produced by prior art techniques, however, have had a common problem of easily coming off from the substrate surfaces upon subjection to external forces. This is attributable, for one thing, to their weak forces of binding to certain types of substrates and, for the other, to the high surface coarseness of the diamond-like thin films which themselves are aggregates of microcrystals. The shortcoming makes the films unable to be fully effective as protective coatings for applications where corrosion resistance or wear resistance is of essential importance. In particular, Fe metals and alloys (e.g., soft steel "STC", stainless steel, and hardened steels "SKD", "SKS"), alloys of other metals such as Co and Ni, glass, and ceramics are known to produce weak bonds between themselves and diamond-like thin films. Iron-based substrates are in use, e.g., for metallic molds and sliding parts, or the applications of the highest industrial utility. Glass and ceramics too have a broad range of applications including sliding members of thermal heads. It is therefore important to improve the adhesiveness of diamond-like thin films to the substrate surfaces on which they are formed.

The molds or dies for injection molding, extrusion, compression molding, etc. of glass and plastics have hitherto been made from cemented carbides. The materials are expensive and require much time and cost to procure and fabricate into the objects. Susceptibility to cracking due to the lack of toughness is another disadvantage. The brittleness of the cemented carbides has to be compensated for and their abrasion resistance be enhanced. To this end, it has been proposed to coat the frictional or sliding surfaces of metallic molds protectively with diamond-like thin films, e.g., by Japanese Patent Application Nos. 60285/1988 and 170849/1988. However, those thin films do not bind firmly enough to the metallic mold substrate surfaces. The inadequate binding force combines with the high surface roughness on account of the aggregation of microcrystals to make the films easy to separate from the mold substrate surfaces by dint of external forces. With the substrate materials of the character, therefore, the diamond-like films have not proved fully satisfactory as protective coatings.

Hardened steels, on the other hand, are available at lower cost and do not squander much time and cost for fabrication but the formed surfaces of metallic mold substrates are worn faster and hence have shorter life. The drawback could be overcome by coating the surfaces with a diamond-like thin film formed by a vapor phase process, as proposed by the above-mentioned two Japanese Patent Applications. However, by the same token, the binding force is insufficient. There are other approaches to the manufacture of diamond-like thin films (refer, e.g., to HYOMEN KAGAKU (Surface Chemistry), vol. 5, No. 108 (1984), pp. 108–115 "Various methods"). Those methods require substrate temperatures high as 600° C. or upwards, which can anneal the hardened steels and impair the hardness of the resulting molds.

Pretreatment of such substrates has been taught, e.g., by Japanese Patent Application Public Disclosure Nos. 200898/1985, 204695/1985, and 174376/1986. No. 200898/1985 recommends ion etching of a Co-WC alloy substrate surface by direct action of DC or AC glow discharge before a diamond-like thin film is formed on the surface as a high-hardness film. The ion etching is aimed at increasing the film-forming rate through an increase in the number of nuclei for the growth of diamond crystals. Since no accelerating voltage is applied, the etching efficiency is not adequately high from the standpoint of enhanced adhesion. The improvement in adhesion to which the present invention is directed is not satisfactorily achieved. No. 204695/1985 likewise aims at an increase in the film-forming rate. The end is attained by introducing Ar gas into a reduced-pressure chamber, applying a voltage across positive and negative electrodes to produce a plasma, and then subjecting a substrate to the plasma action. The plasma ion concentration being limited, the etching effect is rather too low for the improvement of adhesion. No. 174376/1986 improves the adhesion of substrates by treatment with plasma gas and then by oxidation treatment to form an oxide coating. The process uses high frequency waves for the production of a plasma and accelerates positive ions in the plasma that have passed through a grid at positive potential toward a metallic substrate connected to a negative potential. Consequently, the plasma requires diffusion in the first place so that the positive ions can pass through the positive-potential grid. This makes it impossible for a sufficient amount of positive ions to form a film to reach the substrate, with the result that the adhesion cannot be improved to a satisfactory level. In order to overcome these difficulties of the prior art, we previously proposed, in patent application Ser. No. 214913/1989, pretreatment of a substrate by bombardment with high-energy Ar ions or the like. Still the treatment did not bring an adequately enhanced adhesion.

In a further effort to correct the foregoing disadvantages and achieve a real improvement in adhesion, Patent Application Public Disclosure No. 62468/1989 proposed the interposition of an intermediate layer. The layers used for this purpose include those of metals, such as, silicon, aluminum, tungsten, cobalt, and nickel; metal carbides, such as silicon carbide and tungsten carbide; metal nitrides, such as silicon nitride, tungsten nitride, and titanium nitride; and metal oxides, such as silica, alumina, and zirconia.

These intermediate layers, which have to be formed by vacuum deposition or chemical vapor deposition (CVD), complicate the process and require an equipment in addition to the apparatus for forming a diamond-like film. Moreover, the properties of the resulting intermediate layers are not fully acceptable yet.

Patent Application Public Disclosure No. 174508/1984 sets out the ionization evaporation technique that is utilized in the present invention. The reference specification describes that a thin film of Si, Ti or the like is formed as an intermediate layer over a basis metal plate of Ni, Cu, Fe, Co or the like, and then a diamond-like film is formed thereover to provide a Vickers hardness of about 5000. However, the bases of bulk materials such as iron and steel that contain Fe, Co, etc. and stainless steel are not adequately receptive to the application of the coatings, and the coating film of Si or the like does not achieve satisfactory adhesion strength.

U.S. Pat. No. 4,753,414 (to McCandless) uses RF plasma in forming a carbonaceous coating film over a base. According to a paper written by the inventor and cited in the patent specification, the RF plasma method produced a Vickers hardness of only about 1850. The patent process, therefore, is unable to yield the diamond-like film of the present invention. In addition, the same patent is silent on any intermediate layer.

On the other hand, U.S. Pat. No. 5,112,025 claims that a diamond film can be directly formed on a plating film of Ni, with allegedly ample adhesion. However, the fact is the adhesion is "ample" in the sense that the plating film is capable of withstanding a molding pressure of at most about 400 kg/cm$^2$. Apart from this, Ni is originally a hardly adherent metal.

U.S. Pat. No. 4,490,229 (to Mirtish) teaches activating a base by bombardment with neutral Ar to increase the adhesion of a diamond-like film to the base surface. In the absence of accelerating means for the bombarding gas, however, the activation of the base surface is not sufficient for attaining full adhesion, and hence the hardness is unsatisfactory.

None of these printed publications of the prior art suggest that the use of an Mo-intermediate layer makes it possible to form an excellently adherent and hard diamond-like film on a bulk metal such as stainless steel or steel containing Fe, Co, etc.

SUMMARY OF THE INVENTION

The present invention has for its object to provide articles, such as metallic molds, protected with a diamond-like thin film which is strongly bound to and highly adhesive to the substrate and exhibits improved peeling resistance and durability, and provide also a method of manufacturing such articles.

The invention provides a method of forming a diamond-like film on articles, which comprises disposing a grid made of Mo close to a substrate which is made of a material selected from the group consisting of alloys containing at least one chosen from among Co, Ni, and Fe, ceramics, and glass and which has only a slight affinity for the diamond-like thin film, causing a bombarding gas of the atoms of an inert gas such as Ar to bombard both the substrate surface and the grid to remove contaminants from the substrate surface and allow the grid to release Mo atoms onto the substrate to form an Mo film thereon, ionizing a low-molecular-weight hydrocarbon or a feed gas capable of giving a low-molecular-weight hydrocarbon upon decomposition or reaction and thereby producing ions, and then accelerating the ions for deposition on the Mo film, whereby a diamond-like film is formed thereon. The invention provides also articles having a diamond-like protective film thus formed. The articles to which the invention is directed more specifically are metallic molds based on substrates of hardened steel.

DETAILED DESCRIPTION OF THE INVENTION

Figure 1:
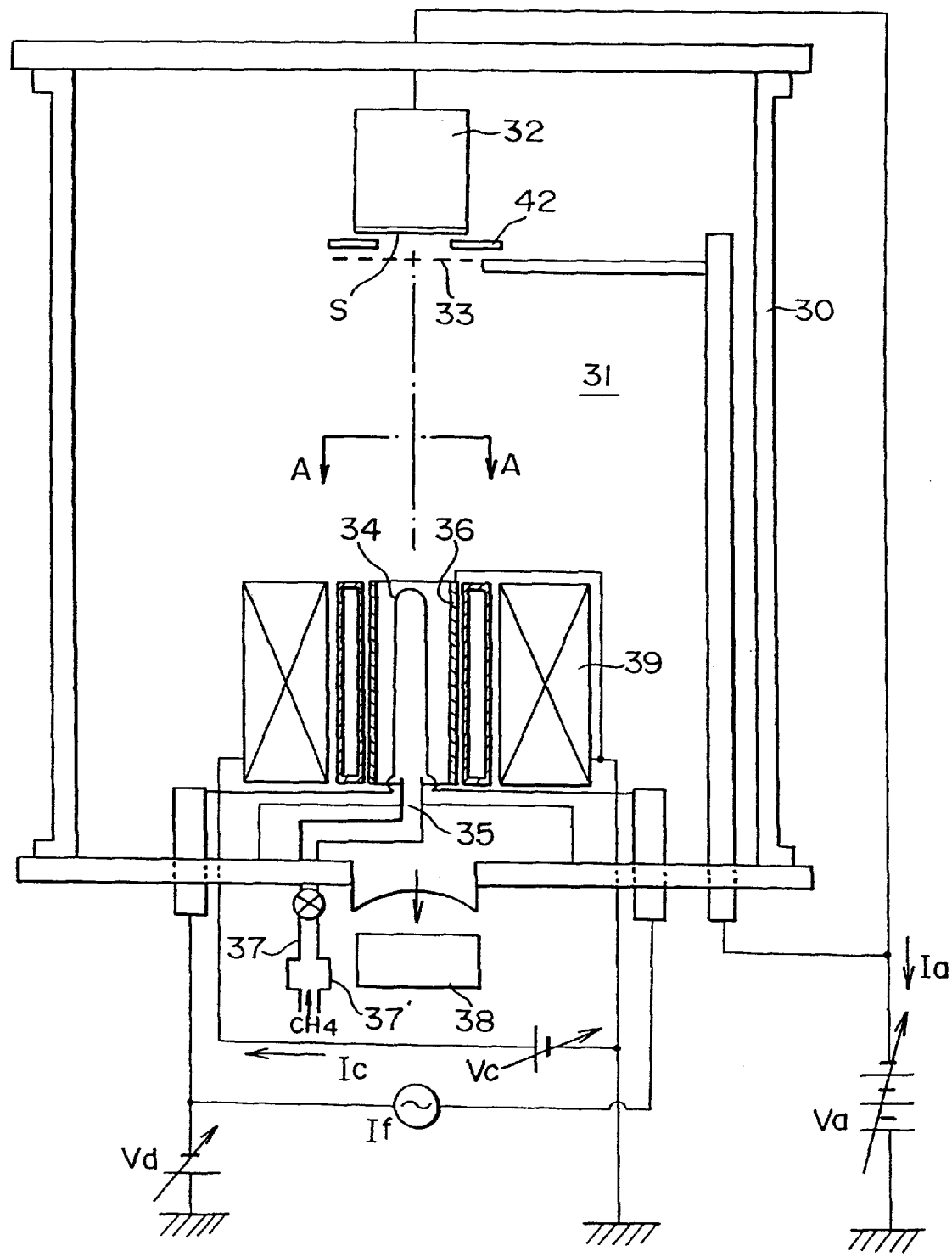
FIG. 1 is a vertical sectional view of an apparatus for forming an Mo-diamond-like protective film in accordance with the present invention.

According to this invention, the formation of an Mo film on the substrate is accomplished, simultaneously with the effect of Ar bombardment of the substrate in conformity with our copending patent application Ser. No. 214913/1989. Both solid bonding of Mo to the substrate and strong bonding of the diamond-like protective film to the Mo-intermediate layer are thus realized. The improved bonding and adhesion to the substrate permits the use of the resulting articles for applications where their wear resistance is evaluated under stringent conditions. Under the invention the Mo film forming and the diamond-like film forming are performed, one after another, by the same apparatus. This simplifies the process and reduces the cost.

The present invention is based on the fact that the formation of a diamond-like film by ionization evaporation is effected by an apparatus which comprises thermionic ionizing means and an electric field-applying grid for accelerating the ions of an ionized hydrocarbon. The end of the invention is achieved by using a grid of Mo instead in the same apparatus and bombarding it with a high-energy bombarding gas of argon (Ar) or the like ionized and accelerated for that purpose.

Especially, the invention renders it possible to form a diamond-like film on the shaped surface of a mold substrate consisting of an inexpensive hardened steel, with a firm bond between the diamond-like protective film and the shaped surface of the mold substrate, by the effect of bombardment with Ar or other similar gas, or preferably by the interposition of an Mo-intermediate layer. Since ionization evaporation does not heat the substrate above 520° C. during the process, the working temperature can be fixed low depending on the annealing temperature of the hardened steel as the substrate. Hence there is no possibility of a metallic mold of hardened steel undergoing a decrease of hardness due to unintentional annealing.

Ionization evaporation in a process for forming a diamond-like thin film which comprises ionizing a hydrocarbon feed gas or a feed gas capable of giving a hydrocarbon upon decomposition or reaction by ionization means, such as arc discharge or thermionic emission between a thermionic cathode filament unit and an anode, and accelerating the resulting ion beam with an electric field and directing it toward a substrate to form a diamond-like thin film thereon. (The term "hydrocarbon" as used herein means a saturated hydrocarbon, such as methane, ethane, or propane, or an unsaturated hydrocarbon, such as ethylene, propylene, or acetylene, etc. The "feed gas capable of giving a hydrocarbon upon decomposition" is, e.g., an alcohol, such as methyl alcohol or ethyl alcohol, or a ketone, such as acetone or methyl ethyl ketone. The "feed gas capable of giving a hydrocarbon upon reaction" is, e.g., carbon monoxide and a mixed gas of carbon dioxide and hydrogen. Such a feed gas may contain at least one chosen from among rare gases, such as helium, neon, and argon, or from among hydrogen, oxygen, nitrogen, water, carbon monoxide, carbon dioxide, etc.) As described in patent application Ser. No. 214913/1989, ionization evaporation does not require such a high substrate temperature of 700° C. or above as is necessary in conventional deposition processes ((refer, e.g., to HYOMEN KAGAKU (Surface Chemistry), vol. 5, No. 108 (1984), pp. 108–115 "Various methods"). It is an outstanding process for forming a diamond-like film with high efficiency, the product having good surface properties and high hardness, thermal conductivity, and refractive index. Among other advantages is the nonnecessity of surface finish.

Film-forming apparatus

There is shown in FIG. 1 an apparatus for forming an Mo-intermediate layer and a diamond-like film, as a preferred embodiment of the invention. The numeral 30 designates a vacuum vessel and 31 a chamber communicated with an evacuation system 38 to be evacuated up to a high vacuum of about $10^{-6}$ Torr. An electrode 32 is located at the back of a substrate (or an article to be protected) S and kept at a negative potential Va. (The substrate, if metallic, may be utilized itself as the electrode.) A mask 42 is provided close to or in contact with the front surface of the substrate S, with a window for controlling the size and shape of the diamond-like thin film to be formed. While the mask may be in contact with the substrate, it is preferably located away from the latter so as to reduce the peripheral thickness of the film and decrease the possibility of cracking. Indicated at 33 is a grid made of Mo and supplied with the same negative potential Va as is the substrate so as to be used in accelerating the hydrocarbon ions during the film-forming process. To enhance the continuity of the film, and smoothen its surface, the grid 33 to be used has a properly chosen porosity (the total area of openings per unit area) and opening density (the number of openings per unit length). It may be equipped with means for causing planar vibrations. A thermionic cathode filament unit 34, kept at a negative potential Vd, is heated by a current If from an AC source to emit thermions. The numeral 35 indicates an inlet for the hydrocarbon feed gas and for bombarding gas such as argon. An anode 36 surrounds the filament unit 34. The anode, while being grounded in this case, maintains a voltage positive to the filament unit and is given a positive potential for the electrode 32 and grid 33. A solenoid 39 is disposed around the filament unit 34, anode 36, and feed inlet 35 so as to be excited by a current Ic from a power supply Vc to produce a magnetic field for the containment of ionized gas. Thus, the formation of the Mo-intermediate layer and diamond-like protective film can be controlled through the adjustments of If, Vd, Va, solenoid current Ic, and ionizing current Ia.

Figure 3:
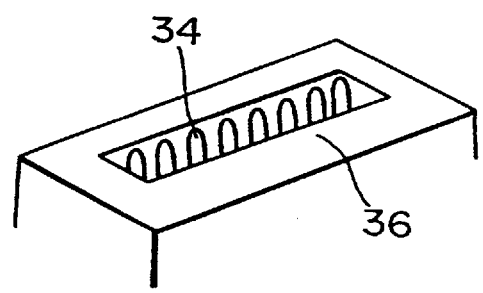
FIG. 3 is a fragmentary, perspective view of a filament unit in an apparatus for producing an Mo-diamond-like protective film according to the invention.

FIG. 3 is a perspective representation of a portion of the apparatus as seen in the direction of arrows A—A in FIG. 1. Where a rectangularly shaped film is to be formed, e.g., an assembly of a plurality of filaments as shown is used or, alternatively, a single filament coil is employed. When a large-area film is to be obtained, it is possible to feed a substance of a corresponding length at a low speed or cause an ion beam to scan at an accordingly reduced speed. Turning to FIG. 1, a line 37 for introducing the hydrocarbon feed gas is formed with a plasma-exciting chamber 37', whereby the efficiency of the ionizing means is enhanced. For the plasma excitation, e.g., microwave, high-frequency wave (RF wave), radioactive rays, and ultraviolet rays can be utilized.

Figure 2:
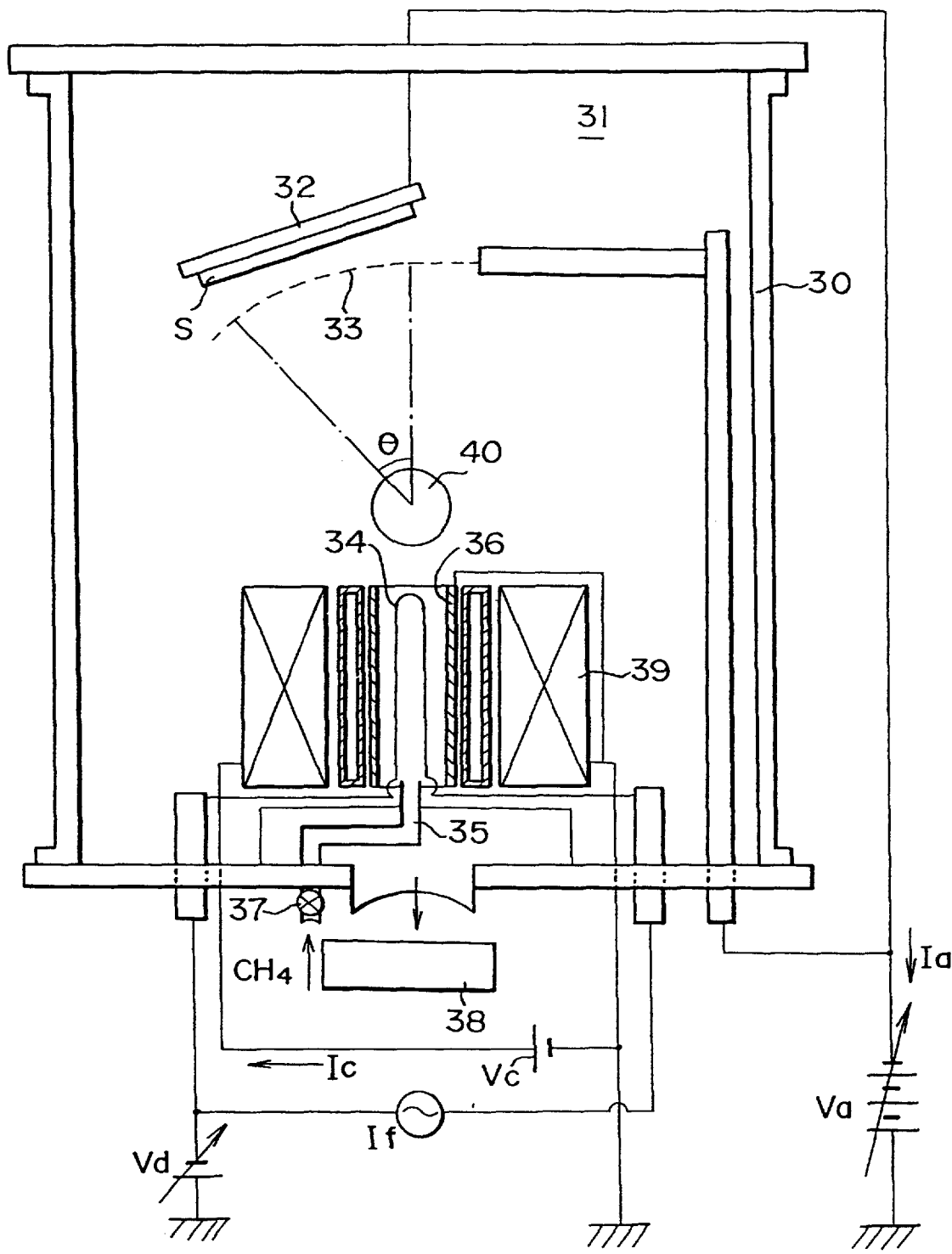
FIG. 2 is a vertical sectional view of another apparatus for producing an Mo-diamond-like protective film embodying the invention.

As a further alternative, it is possible to modify part of the construction of FIG. 1 as shown in FIG. 2, with a magnet 40 of fixed or variable strength located above the filament unit 34 so as to deflect an ion beam in the plasma state. The magnetic field produced by the magnet 40, with the strength fixed or variable, is directed at right angles to the direction in which the ion beam travels. This arrangement gives a deflection angle θ for the desired ion beam, e.g., of $CH_3^+$ or $CH_4^+$ ions. With a fixed arrangement, ions vastly different in mass from these ions, such as hydrogen ions, are deflected to an even greater angle. Neutral particles and heavy polymeric ions move straight ahead. It then follows that if the mask is located ahead, only highly crystalline ions will deposit on the substrate S.

Forming an Mo film

An Mo-intermediate layer is formed on a slightly adhesive substrate of Fe or its alloy, glass, or ceramics, particularly on a metallic mold substrate of hardened steel, in the following manner. First, the vacuum chamber is evacuated to about $10^{-6}$ Torr and a bombarding gas chosen from among argon, nitrogen, hydrogen, helium, neon, etc. is introduced to about 0.1 Torr. The filament unit 34 ionizes the gas, and the grid 33 accelerates the resulting ions, e.g., of argon. The argon ions bombard and clean the surface of the substrate S to improve its adhesiveness while driving Mo off from the grid onto the substrate. The voltages applied to or the currents flown through the individual parts, the molecular weight of the bombarding gas (or the average molecular weight in case of a mixed gas), treating time, etc. serve as necessary controlling factors.

The energy of the bombarding gas is calculated by the formula $$\text{molecular weight} \times \text{Ia (mA)} \times \text{time (hr)}$$

where molecular weight is that of the bombarding gas, Ia is the ionizing current, and time is the bombardment treating time. It is desirable that the energy satisfy $$500 < \text{molecular weight} \times \text{Ia (mA)} \times \text{time (hr)} < 800.$$

If the value is too small, the energy of Mo grid bombardment becomes insufficient, resulting in inadequate Mo film formation. If the value is excessive, other components of the apparatus too are etched and the intrusion of impurities lowers the adhesiveness of the resulting film. Preferably, the energy of bombardment ranges from 500 to 800.

Where the hardened steel surface is to be activated before the Mo bombardment, the energy should be between 50 and less than 500. A grid of Mo, SUS303, W or the like may be used. The binding force of the Mo layer is permissible up to the range where the energy is high. The bombardment and the formation of an intermediate layer are continuously variable, and the provision of an intermediate layer gives good result.

Forming a diamond-like film

The next step of forming a diamond-like protective film starts with the evacuation or the chamber 31 to a vacuum as high as $10^{-6}$ Torr. A valve on the gas feed line 37 is manipulated to admit methane gas alone or its mixture with hydrogen gas, or with Ar, He, Ne, or other carrier gas, all at predetermined rates, into the chamber through the inlet 35. With concurrent adjustment of the evacuation system 38, a desired gas pressure, e.g., $10^{-1}$ Torr, is secured. Meanwhile, the plurality of thermionic cathode filaments 34 are heated by passage of the AC current If, and the differential potential Vd is applied between the filament unit 34 and the anode 36 to produce a discharge. Methane gas or other hydrocarbon fed via the inlet 35 is thermally decomposed and collides with the thermions from the filaments to give positive ions and electrons. The electrons, in turn, collide with other thermally decomposed particles. This phenomenon is repeated under the containment action by the magnetic field of the solenoid until the methane gas is totally converted to positive ions of the thermally decomposed substance.

The positive ions are attracted by the negative potential Va applied to the electrode 32 and the grid 36 and accelerated toward the shaped surface of the substrate S. They thus impinge on the substrate surface of the metallic mold and, through a film-forming reaction, produces a diamond-like protective film thereon. When desired, a thin film of better quality can be obtained using the above-mentioned fixed magnet. The thickness of the film so formed ranges from 0.1 to 100 $\mu$m, and in the case of a metallic mold, preferably from 0.5 to 100 $\mu$m, more preferably from 1 to 50 $\mu$m. If the thickness is less than the general range, the wear resistance and other beneficial effects are reduced. If it exceeds the range no more improvements are attained while the manufacturing time has to be extended. The hardness of the diamond-like thin film is at least 5000 kg/mm$^2$, preferably at least 6000 kg/mm$^2$. Thus, "diamond-like thin film" having a hardness of 5000 kg/mm$^2$ or more is preferably produced by ionization evaporation.

The invention is illustrated by the following examples.

EXAMPLE 1 AND COMPARATIVE EXAMPLES

The apparatus shown in FIG. 1 was used and a piece of steel plate SKS2 or SKD11 was placed as a substrate S in the vacuum vessel 30. At a distance of about 6.0 mm downwardly from the substrate surface was hold a grid 33 of Mo, W, or SUS303. The distance between the substrate S and the anode was about 40 mm. Each grid 33 had an opening density of 60 openings per 25.4 mm and a porosity of 41%.

Forming Mo films: The vacuum vessel 30 was evacuated to $10^{-6}$ Torr and Ar and H$_2$ gases were introduced. At a gas pressure of 0.1 Torr the thermionic cathode filament unit 34 was caused to discharge. The magnetic flux density of the solenoid 39 was fixed to 400 Gs, the substrate voltage and grid voltage Va to $-300$ V, and the substrate temperature to 200° C. A current If of 20 A was flown through the filament unit 34. The filament voltage Vd was set to $-10$ V with variable Ia. The filament unit 34 was in the form of a coil 3 mm wide, and the gap between the coil and the electrode 36 surrounding it was 8 mm. The grid was vibrated at the rate of 5 mm/min.

Forming a diamond-like protective film: The Ar supply was shut off, the vacuum vessel 30 was evacuated to $10^{-6}$ Torr, and methane gas was introduced to a gas pressure of $10^{-1}$ Torr, when the thermionic cathode filament 34 was caused to discharge. The magnetic flux density of the solenoid 39 was fixed to 400 Gs, the substrate voltage Va to $-300$ V, and the substrate temperature to 200° C. A current If of 25 A was flown through the filament unit 34.

The filament unit 34 was in the form of a coil 3 mm wide, and the gap between the coil and the electrode 36 surrounding it was 8 mm. The grid was vibrated at the rate of 5 mm/min.

Under the conditions of the filament voltage Vd=$-30$ V and Vc=30 V, a 1.0 $\mu$m-thick diamond-like film was obtained.

The films thus obtained were tested for their adhesion strength and scratch hardness values under microscopic observation. The results are summarized in Table 1. The adhesion strength was determined by bonding a test diamond-like thin film with epoxy resin to a square bar 1 cm square and 10 cm long and then peeling the film from the bar on a tensile tester (marketed under the trade designation "Tensilon"). The scratch hardness was determined by means of a CSR Scratch Tester manufactured by Resca. The results were compared with the standard values or 1.0 each when the treating energy (molecular weight×Ia (A)×time (hr)) was set to 100.

For comparison purposes, the results with grids made of W and steel. SUS303 are also given in the table.

TABLE 1

| Grid material | Molecular weight × Ia × time | SKS2 Adhesion strength | SKS2 Scratch hardness | SKD11 Adhesion strength | SKD11 Scratch hardness |
|---|---|---|---|---|---|
| Mo | 100 | 1.0 | 1.0 | 1.0 | 1.0 |
| Ma | 600 | 1.2 | 2.1 | 1.3 | 2.2 |
| Mo | 1000 | 0.8 | 0.6 | 0.7 | 0.5 |
| W | 600 | 0.5 | 0.5 | 0.4 | 0.2 |
| SUS 303 | 600 | 0.3 | 0.1 | 0.3 | 0.1 |

As can be seen from Table 1: the Ar ion molecular weight×. Ia×time of approximately 600 produces good adhesion strength and scratch hardness. Generally, the value ranges from more than 500 to less than 1000, preferably from more than 500 to less than 800. On the other hand, W gives better results than the ordinary grid material of SUS303 but not as good as Mo does.

EXAMPLE 2

The procedure of Example 1 was repeated using a grid of Mo with the exception that a cemented carbide steel was used in addition to SKS2 and SKD11 as metallic mold substrates and the varied treating energies as given in Table 2 were used. The results are shown in Table 2. In the table the "abraded area" is a value obtained by measuring the surface roughness Ra before and after grinding in conformity with the JIS standards and multiplying the difference by the length of scanning. The "scratch hardness" is a relative value measured on the basis of a test piece of SKD11 having a 0.1 $\mu$m-thick film treated with an energy of 550.

TABLE 2

| Metallic mold substrate material | Molecular weight × Ia × time | Film thickness u | Vickers hardness | Abraded area | Scratch hardness |
|---|---|---|---|---|---|
| SKD 11 and diamond-like thin | 550 | 0.1 | 7000 | 40 | 1.0 |
| | 550 | 0.6 | 7000 | 20 | 1.5 |
| | 550 | 5.0 | 7000 | 20 | 1.6 |
| | 550 | 5.0 | 3000 | 50 | 0.8 |
| | 550 | 5.0 | 6000 | 20 | 1.6 |

TABLE 2-continued

| Metallic mold substrate material | Molecular weight × Ia × time | Film thickness u | Vickers hardness | Abraded area | Scratch hardness |
|---|---|---|---|---|---|
| film | 650 | 5.0 | 7000 | 18 | 2.2 |
|  | 550 | 25 | 7000 | 20 | 1.7 |
|  | 550 | 100 | 7000 | 20 | 1.7 |
| SKD 11 | — | — | 800 | 500 | — |
| Cemented carbide steel | — | — | 1800 | 180 | — |

As Table 2 clearly indicates, the use of an Mo grid gives good adhesion strength and scratch hardness upon treatment with an energy of Ar ion molecular weight×Ia×time=about 550 to 650. Both the hardened steel SKD11 and cemented carbide steel showed low degrees of hardness.

The present invention successfully manufactures articles having a diamond-like protective thin film which binds firmly to the substrate by means of an apparatus for forming a diamond-like film by ionization evaporation onto the substrate to be protected, especially a metallic mold, in which an electric field-applying grid to accelerate the ions of an ionized hydrocarbon is built of Mo and it is bombarded by a high-energy bombarding gas produced by ionizing argon (Ar) or the like and accelerating the resulting ions, whereby an Mo film is formed on the substrate and thence a diamond-like thin film is formed on the Mo film. According to the invention, the substrate is not limited to metals; the films can also be formed on such electrically insulating substrates as glass and ceramics without difficulty.

The invention thus uses an apparatus for performing ionization evaporation and bombards the shaped surface of a metallic mold substrate of hardened steel to be protected, with a high-energy bombarding gas formed by ionizing argon or the like and accelerating the resulting ions by an electric field-applying grid, thereby activating the shaped surface of the metallic mold substrate, or using a grid of Mo and forming a Mo film an the substrate surface, and further forming a diamond-like thin film thereon. In this way a metallic mold substrate having a diamond-like protective thin film formed thereon as solidly bound to the substrate surface can be obtained. The metallic mold thus obtained in accordance with the invention is an inexpensive mold which exhibits high performance despite the use of a hardened steel, a material of rather inferior properties, as the substrate.

What is claimed is:

1. An article having a diamond-like film formed thereon which comprises a substrate of a material selected from the group consisting of alloys containing at least Co, Ni, or Fe, ceramics, and glass and which has only a slight affinity for a diamond-like thin film, an Mo film formed on the substrate, and a diamond-like thin film consisting of an amorphous carbon having a Raman's absorption at about 1,550 $cm^{-1}$ but not having a sharp peak at 1,333 $cm^{-1}$ formed further thereon with the substrate at no greater than 520° C. and said diamond-like thin film having a thickness of 0.1–100 $\mu$m.

2. The article of claim 1 in which said diamond-like thin film has been formed with the substrate at no greater than 520° C.

3. The article of claim 1 or 2 in which the substrate is a metallic mold constructed of a hardened steel.

4. The article of claim 1, wherein the Mo film consists essentially of Mo.

* * * * *